US012759493B2

(12) United States Patent
Gündogan et al.

(10) Patent No.: US 12,759,493 B2
(45) Date of Patent: Oct. 13, 2026

(54) BUMPER CROSSMEMBER FOR A VEHICLE

(71) Applicant: Kirchhoff Automotive Deutschland GmbH, Attendorn (DE)

(72) Inventors: Aydogan Gündogan, Plettenberg (DE); Dirk Junglas, Düngenheim (DE)

(73) Assignee: Kirchhoff Automotive Deutschland GmbH, Attendorn (DE)

( * ) Notice: Subject to any disclaimer, the term of this patent is extended or adjusted under 35 U.S.C. 154(b) by 304 days.

(21) Appl. No.: 18/687,461

(22) PCT Filed: Sep. 30, 2022

(86) PCT No.: PCT/EP2022/077257
§ 371 (c)(1),
(2) Date: Feb. 28, 2024

(87) PCT Pub. No.: WO2023/057326
PCT Pub. Date: Apr. 13, 2023

(65) Prior Publication Data

US 2024/0359649 A1 Oct. 31, 2024

(30) Foreign Application Priority Data

Oct. 8, 2021 (DE) ..................... 10 2021 126 164.3

(51) Int. Cl.
*B60R 19/18* (2006.01)

(52) U.S. Cl.
CPC ...... *B60R 19/18* (2013.01); *B60R 2019/1813* (2013.01)

(58) Field of Classification Search
CPC ........................ B60R 19/18; B60R 2019/1813
(Continued)

(56) References Cited

U.S. PATENT DOCUMENTS 8,950,794 B2 2/2015 Lenkenhoff
9,446,799 B2 9/2016 Franzpötter
(Continued)

FOREIGN PATENT DOCUMENTS

DE 102013100720 A1 7/2014
DE 102013015420 * 4/2015
(Continued)

OTHER PUBLICATIONS

Pending U.S. Appl. No. 18/687,402, filed Feb. 28, 2024 (Grüssing et al.).

(Continued)

*Primary Examiner* — Muhammad Shafi
(74) *Attorney, Agent, or Firm* — Polson Intellectual Property Law P.C.; Margaret Polson; Christopher Sylvain

(57) ABSTRACT

A bumper crossmember with a hat-shaped profile having an upper limb, a lower limb, and a web connecting the two limbs together. At the ends pointing away from the web, a respective flange is formed on the limbs angled toward the outside of the crossmember relative to the plane of the respective limb. A rebounding flange extending over a portion of the respective limb is formed on the flanges. Each end of the crossmember has a crash box attachment portion. Between the crash box attachment portions, the crossmember has at least one deformation zone due to a concave structure formed in the direction of the crossmember cavity in the web that connects the limbs. In the region where the concave structure extends in the longitudinal direction of the crossmember, the rebounding flange has a convex-shaped protrusion. Adjacent to the crash box attachment portions, the crossmember has a greater depth in the direction toward the center of the crossmember than in the crash box attachment portions, the transition being provided by the interpo-
(Continued)

sition of a deformation zone provided a concave web portion.

20 Claims, 4 Drawing Sheets

(58) Field of Classification Search
USPC .......................................................... 293/102
See application file for complete search history.

(56) References Cited

U.S. PATENT DOCUMENTS

| | | | | |
|---|---|---|---|---|
| 9,598,100 | B2 | 3/2017 | Lenkenhoff | |
| 9,764,764 | B2 | 9/2017 | Irle | |
| 10,005,495 | B2 | 6/2018 | Töller | |
| 10,577,025 | B2 | 3/2020 | Michler | |
| 10,787,138 | B2 * | 9/2020 | Lucas-Nuelle | B60R 19/34 |
| 10,882,559 | B2 | 1/2021 | Gündogan | |
| 11,142,248 | B2 | 10/2021 | Günther | |
| 11,148,623 | B2 | 10/2021 | Günther | |
| 11,148,624 | B2 * | 10/2021 | Vovesny | B60R 19/34 |
| 11,235,720 | B2 | 2/2022 | Höning | |
| 11,292,409 | B2 | 4/2022 | Töller | |
| 11,505,146 | B2 | 11/2022 | Weige | |
| 11,708,040 | B2 | 7/2023 | Günther | |
| 11,731,707 | B2 | 8/2023 | Tentscher | |
| 11,819,944 | B2 | 11/2023 | Töller | |
| 11,851,109 | B2 | 12/2023 | Weige | |
| 11,858,577 | B2 | 1/2024 | Günther | |
| 11,912,218 | B2 | 2/2024 | Tlauka | |
| 11,975,763 | B2 | 5/2024 | Gündogan | |
| 11,987,192 | B2 | 5/2024 | Günther | |
| 12,024,007 | B2 | 7/2024 | Günther | |
| 12,024,106 | B2 | 7/2024 | Günther | |
| 2006/0071485 | A1 * | 4/2006 | Karlander | B60R 19/18 293/102 |
| 2015/0336526 | A1 * | 11/2015 | Handing | B60R 19/34 293/133 |
| 2020/0317012 | A1 * | 10/2020 | Adamski | B60D 1/565 |
| 2022/0314912 | A1 | 10/2022 | Töller | |
| 2023/0123267 | A1 | 4/2023 | Günther | |
| 2023/0131692 | A1 | 4/2023 | Lagin | |
| 2023/0166597 | A1 | 6/2023 | Günther | |
| 2023/0202567 | A1 | 6/2023 | Günther | |
| 2023/0406247 | A1 | 12/2023 | Lagin | |
| 2024/0166269 | A1 | 5/2024 | Günther | |
| 2024/0174036 | A1 | 5/2024 | Günther | |

FOREIGN PATENT DOCUMENTS

| | | | | |
|---|---|---|---|---|
| DE | 102013015420 | A1 | | 4/2015 |
| EP | 1730002 | B1 | | 9/2007 |
| EP | 3254905 | | * | 12/2017 |
| EP | 3661813 | | * | 3/2021 |
| WO | WO-2021018804 | | * | 2/2021 |

OTHER PUBLICATIONS

Pending U.S. Appl. No. 18/706,486, filed May 1, 2024 (Lagin et al.).
International Search Report (ISR) of the International Searching Authority (ISA-EPO) mailed Feb. 3, 2023 in parent international application PCT/EP2022/077257.
Written Opinion (WO) of the International Searching Authority (ISA-EPO) mailed Feb. 3, 2023 in parent international application PCT/EP2022/077257.
U.S. Department of Transportation National Highway Traffic Safety Administration, Laboratory Test Procedure for FMVSS 301R: Fuel System Integrity—Rear Impact, TP-301R-02 (Jan. 17, 2007) [46 pages].

* cited by examiner

BUMPER CROSSMEMBER FOR A VEHICLE

BACKGROUND

The disclosure relates to a bumper crossmember for a vehicle with a crossmember which is convexly curved pointing away from the vehicle side and extends in the vehicle transverse direction, with a crash box attachment portion in each end of the crossmember. The crossmember comprises a hat-shaped cross-sectional geometry profile with an upper limb/arm, a lower limb/arm, and a connecting piece/web connecting the two limbs, the opening of which points away from the web. A flange is formed on each limb at the ends opposite the web. The flange is angled towards the outside of the crossmember relative to the plane of its respective limb. A rebounding flange is formed at least in some regions on the flanges extending over a portion of the respective limb.

The directions used within the context of this disclosure, i.e. the x direction, y direction, and z direction correspond to the directions as they are usually used in vehicles. The x-direction corresponds to the longitudinal extent of the vehicle. The y-direction is the vehicle transverse direction, and the z-direction is the height direction of the vehicle.

In a motor vehicle, a bumper crossmember serves to protect the units behind it and the passenger compartment in the event of a head-on collision. The bumper crossmember extends transversely (y-direction) to the direction of travel (x-direction) of the vehicle and is arranged in front of the units to be protected. The longitudinal extent of the bumper crossmember follows the y-direction. At its lateral end regions, the crossmember of the bumper crossmember is connected to a longitudinal member component of the vehicle, typically to a crash box. When absorbing forces acting frontally on a motor vehicle, the bumper crossmember is subjected in particular to bending stress. To counteract this, bumper crossmembers have stiffening structures in order to prevent bending or buckling and the associated tearing as far as possible.

Such bumper crossmembers include a single- or double-shell crossmember, with a first shell profile having a U-shaped profile and the opening of the U-shaped profile facing in the direction of travel. If a box profile is to be provided, a striking plate is used to close this crossmember opening. The U-shaped profile represents the stiffening structure. Additional beads, which are incorporated into the striking plate and/or in the U-shaped member profile along the longitudinal extent of the bumper crossmember, serve to stiffen the bumper crossmember. Such a crossmember is convexly curved in a direction away from the vehicle. The apex of the curvature is located in the longitudinal extension of the vehicle (x direction) in front of the attachment to the crash boxes. The connection of the crash boxes is therefore located at a distance from the vertex of the crossmember in the x direction.

Bumper crossmembers have been further developed in different aspects. DE 10 2013 100 720 B4, for example, discloses a bumper crossmember for a vehicle which is in one piece and does not require a striking plate. This reduces the weight and manufacturing costs.

EP 1 730 002 B1 discloses a bumper crossmember with a double-shell crossmember. The rear support part, which is located closer to the vehicle, has a hat-shaped profile. The crossmember opening facing away from the vehicle is closed by a striking plate. In this bumper crossmember, the middle portion located between the crash boxes is provided with a smaller depth so that there is space for a radiator at this point, and thus the bumper crossmember contributes as little as possible to the overall length of the vehicle. Angled flanges directed away from one another are formed on the limbs of the U-shaped member profile part. These give the crossmember profile its hat-shaped cross-sectional geometry. The striking plate is connected to these angled flanges. In the region of the radiator recess, the hat-shaped member part has a greater height (z-direction) and a smaller depth (x-direction). In addition, rebounding flanges are formed onto the flanges.

Furthermore, another bumper system is known from DE 10 2013 015 420 A1, which is formed with a convex hat-shaped profile with depressed flanges.

Such bumper crossmembers must meet different tests with their crash boxes connected to the crossmember part. One of these tests is the crash repair test (AZT test) developed at the Allianz Center for Technology. This test is used internationally as a test for assessing the ease of repair of vehicles after minor accidents. In this test, the vehicle drives at 15 km/h in a frontal crash into a hard barrier with a 40 percent vehicle front overlap and an inclination of the barrier of 10°. In order to meet the AZT test, the impact energy must be dissipated by the bumper crossmember without damaging units or chassis components behind it, such as longitudinal members or the like. Then, in the event of an accident under these conditions, only the bumper crossmember needs to be replaced.

In order to meet the requirements of the AZT test, the crash boxes used for energy absorption can have an appropriate length, because the longer a crash box is, the more energy can be absorbed. In other designs, insert parts are located within the crash box so that more energy can be absorbed in the event of an impact. The cross-sectional area of a crash box cannot be increased arbitrarily because it should not exceed the height of a bumper crossmember.

Bumper crossmembers also have to pass other tests, such as a so-called high-speed bumper test or a rear impact test to check the integrity of the fuel system. The latter test is described in Laboratory Test Procedure for FMVS 301R—Fuel System Integrity—Rear Impact of the US Department of Transportation National Highway Traffic Safety Administration (TP-301R-02 dated Jan. 17, 2007). In this test, a barrier with an overlap of approximately 70% acts on the rear of the vehicle and thus on the center of the bumper crossmember.

SUMMARY

Proceeding from this background, one aspect of the disclosure is therefore to develop a bumper crossmember for a vehicle in such a way that neither overly long crash boxes nor crash boxes with specific absorption inserts have to be used, for example in order to meet the AZT test or the Fuel System Integrity-Rear Impact test. In addition, it should be inexpensive to produce.

This may be provided by a bumper crossmember of the type mentioned at the outset, wherein the crossmember has at least one deformation zone between the crash box attachment portions due to a concave structure present in the direction of the crossmember cavity in the web connecting the limbs, and wherein the rebounding flange, in the region of the extension of the concave structure in the longitudinal direction of the crossmember, has a greater flange height than the adjacent sections or portions of the rebounding flange due to a convexly shaped protrusion of the rebounding flange.

This may also be provided by a bumper crossmember of the type mentioned at the outset, wherein the crossmember adjacent to the crash box attachment portions has a greater depth towards the center of the crossmember than in the crash box attachment portions, and the transition from the crash box attachment portions to those with a greater depth is provided with the interposition of a deformation zone provided by a concave web portion.

In contrast to the prior art discussed above, this bumper crossmember has at least one deformation zone. The axis of a deformation in the y-direction runs in the vertical direction of the member (z-direction), at least mainly. The deformation zone is located on the side of the crossmember facing the vehicle and is provided by a concave structure or concave web portion introduced into the connecting piece/web connecting the two limbs/arms. In this bumper crossmember, a defined local deformation of the crossmember, limited to the deformation zone, is integrated into the crash management in such a way that impact energy is absorbed in the deformation zone by corresponding deformation, without the risk of the crossmember tearing open under normal test conditions, for example according to the AZT test conditions. The same also applies to a high-speed bumper test and the rear impact test described above. For this reason, the at least one deformation zone is defined by a concave, rounded structure, with the apex of this structure pointing towards the crossmember cavity. This ensures that during such an AZT test, a certain material reservoir is provided by the concave, rounded structure of the web in order to compensate for elongation of the web in the event of such an impact in the area of the deformation zone, so that the crossmember does not tear open under such stress. According to the first proposed solution, the rebounding flanges, in their extension following the longitudinal extent of the concave structure, have a greater flange height than the adjacent rebounding flange portions due to a convex and thus also rounded protrusion. As a result, the front of the crossmember in the x direction opposite the concave structures defining the deformation zones is reinforced in such a way that the rebounding flanges in this portion can be exposed to a higher tensile load without tearing. This measure cleverly reduces the elastic stiffness and concentrates deformation on the deformation zones.

A special feature of this bumper crossmember is that it obtains its properties described above solely due to its particular shape, and therefore no tailor rolled blanks need to be used to produce the crossmember. Although this is possible, it is not necessary. The advantage of this bumper crossmember compared to using tailor rolled blanks is that the crossmember has a uniform material thickness in its limbs and web. A deformation zone between the two crash box attachment portions is thus provided solely by the concave structure introduced into the web of the crossmember and the rebounding flange protrusion. In the case of a tailer rolled blank, the crossmember would be weakened overall by a lower material thickness to form such a deformation zone.

Since in this bumper crossmember, the crossmember is also integrated into the crash management for energy absorption using its convex curvature, which is directed away from vehicle, the crash boxes only need to be relatively short. The energy to be absorbed by the bumper crossmember in the event of an impact, for example according to the AZT test, is thus distributed between the crash boxes and the crossmember. This also applies to impact tests in which the barrier is provided with a larger coverage than in the AZT test and acts on the center of the bumper crossmember. The above applies equally to the second proposed solution of providing a deformation zone in the immediate vicinity of a crash box attachment portion via a concave web portion, since in this embodiment, the bumper crossmember has a smaller depth in its crash box attachment portions than in the adjacent portion located between the crash box attachment portions. As a result, due to the smaller depth of the crossmember, the stress on the tension side is not so high to require a rebounding flange protrusion also be provided at this point. In general, it is sufficient if a rebounding flange is present opposite the concave web portion in the x direction and thus on the tension side of the crossmember in the event of deformation according to the AZT test.

An increase in crash performance of the bumper crossmember can be achieved by integrating the concave structure or the concave web portion present in the connecting piece, or web, of the crossmember with a transition portion, which is also curved, in the web portions adjacent in the longitudinal extent of the crossmember. According to an example embodiment, the radius of curvature of such a transition portion corresponds to the radius of the concave structure or concave web portion.

The same applies to the design of the convex rebounding flange protrusion, which also merges into the rebounding flange portions adjacent in the longitudinal member extent with a curved transition portion.

The crash performance of such a bumper crossmember can also be influenced in terms of absorbable energy by the number of deformation zones described above. In the event of an impact, a defined energy is absorbed in each deformation zone. Therefore, a bumper crossmember with more than one deformation zone, as described above, can also absorb more energy without having to make changes to the crash box.

According to one example embodiment, such a bumper crossmember has multiple, for example two, deformation zones between its crash box attachment portions, each deformation zone provided by a concave structure introduced into the web in the direction of the crossmember cavity with flange protrusions at a corresponding position on the tension side of the crossmember. When two such deformation zones are provided between the crash box attachment portions, the distance between the deformation zones is greater than the distance between them and the crash box attachment portions. With respect to the center of the crossmember in its longitudinal extent, the distance of the apex of such a concave structure to the crash box attachment portion is greater than the distance from the center of the crossmember. In one example embodiment it is provided that the distance of the apex of the concave structure from the adjacent crash box attachment portion is approximately 55-60% of the total distance of the center of the crossmember from the crash box attachment portion.

In a further development, a third deformation zone is centrally provided between these two deformation zones. A larger number of deformation zones on the web connecting the limbs is also possible. However, the number of deformation zones should not be so large that the desired stiffness is lost and ultimately there are no longer any individual deformation zones as spatially limited zones.

Since the tension side of the crossmember does not have to be designed to absorb a larger tensile force in the second proposed solution, the rebounding flanges can taper off towards the crash box attachment portion, for example when they just reach the crash box attachment portion. With such a design, the end portions of the crossmember have no rebounding flanges, whereby the weight of the crossmember is reduced accordingly.

The height of the limbs (extension in the x direction) of the crossmember can be the same for both limbs. It is also possible to make the height of one limb, preferably the upper limb, longer than that of the other limb. The upper limb, which is longer in this configuration, then protrudes in relation to the lower limb. In the event of an impact, this protrusion is already deformed with less energy, so that this protrusion also contributes to the absorption of impact energy.

The crossmember is typically formed from a high strength steel. It is entirely possible to provide the crossmember with different ductility in individual portions.

In a further development, it is provided that the crossmember cavity, which opens away from the vehicle, is closed at the front in at least one section by a striking plate. In general, when designing the bumper crossmember with a striking plate, the striking plate is provided over the entire length of the crossmember.

BRIEF DESCRIPTION OF THE DRAWINGS

The following description is provided using an example embodiments with reference to the attached figures, wherein.

DETAILED DESCRIPTION

Figure 1:
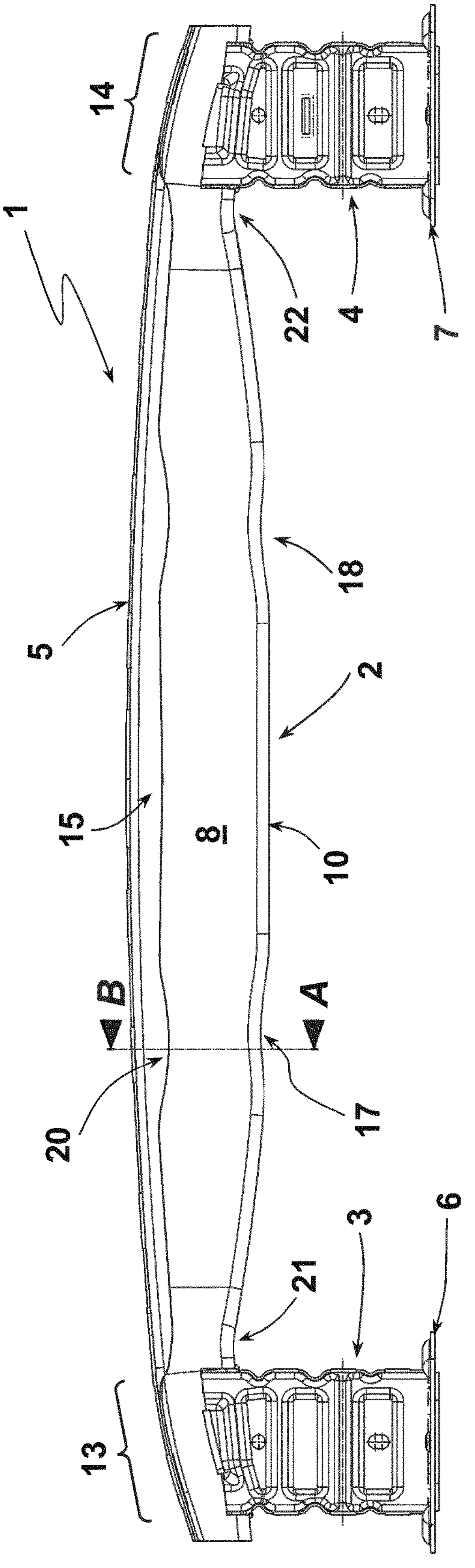
FIG. 1 shows a top view of a bumper crossmember according to the disclosure.
Figure 2:
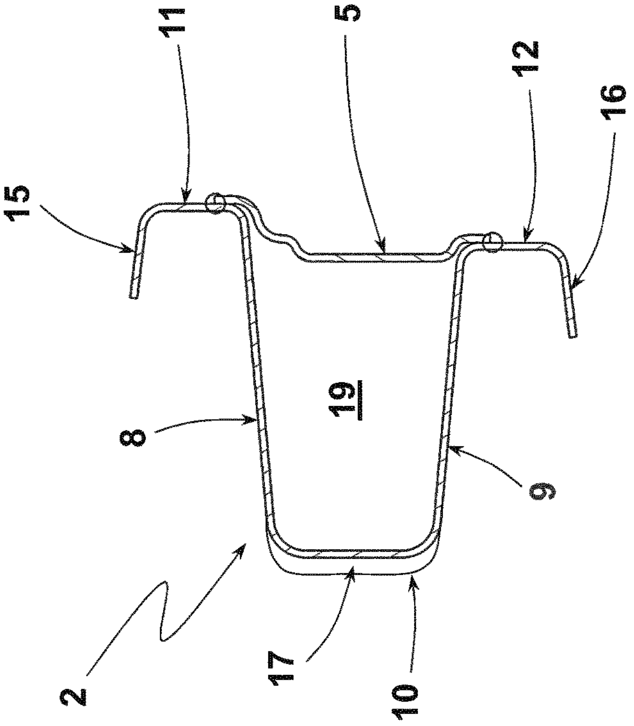
FIG. 2 shows a sectional view of the bumper crossmember along line A-B of FIG. 1.

A bumper crossmember 1 for a vehicle, which is intended for attachment to the front or rear of a vehicle, comprises a hat-shaped profiled crossmember 2, wherein the opening side of the crossmember 2 faces away from the vehicle (upward in the illustration in FIG. 1), two crash boxes 3, 4 and a striking plate 5 that closes the crossmember opening. The crossmember 2, the crash boxes 3, 4 and the striking plate 5 in the example embodiment shown are steel components made of a high-strength steel that is customary for such components. The crossmember 2 itself is convexly curved in the direction of its profile opening and thus pointing away from the vehicle. In the example embodiment shown, the curvature is continuous. The crash boxes 3, 4 are connected to the back side of the crossmember 2 facing the vehicle and each carry a connection plate 6, 7 at their other end for connecting the bumper crossmember 1 to the chassis of a vehicle. The hat-shaped profile of the crossmember 2 can be seen from the sectional view in FIG. 2. The crossmember 2 comprises two limbs or legs 8, 9, which are connected to one another by a connecting piece or web 10. In the example embodiment shown, the limbs 8, 9 are inclined towards one another, wherein the smallest distance between the limbs 8, 9 is in the area of the web 10. A respective flange 11, 12 is formed on the ends of the limbs 8, 9 opposite the web 10. The flanges 11, 12 are bent away from one another relative to the limbs 8, 9. The alignment of the flanges 11, 12 is in the z direction. The striking plate 5, which in the example embodiment shown extends over the entire longitudinal extent of the crossmember 2, is connected to the flanges 11, 12, which also extend over the entire length of the crossmember 2. The striking plate 5 is welded to the flanges 11, 12. The two outside end portions of the crossmember 2 are the crash box attachment portions 13, 14. The walls of the crash boxes 3, 4 facing in the y-direction have, on their end face facing the crossmember 2, a shape that is complementary to the cross-sectional shape of the crossmember 2 in this portion. The crash boxes thus overlap the web-side end portion of the crossmember 2 with their upper wall and their lower wall. The crash boxes 3, 4 are welded to the crossmember 2.

In the crossmember portion between the two crash box attachment portions 13, 14, a rebounding flange 15, 16 is formed on the flanges 11, 12 and therefore extends in some regions over the limbs 8, 9.

The bumper crossmember 1 is designed in such a way that it has two deformation zones 17, 18 in the central portion located between the crash box attachment portions 13, 14. The deformation zone 17 is described in more detail below. These explanations apply equally to the deformation zone 18, which is designed in the same way. The deformation zone 17 is defined by a concave structure introduced into the web 10 of the crossmember 2 in the direction of the crossmember cavity 19 enclosed by the limbs 8, 9 and the web 10. This concave structure reduces the depth of the crossmember 2 (extent in the x direction) compared to a course of the web 10 without a concave structure. The concave structure of the deformation zone 17 merges into the adjacent crossmember portions via a respective transition portion with a radius similar to that of the concave structure. This embossing extends over the entire height of the web 10 and can be clearly seen in the top view of the bumper crossmember 1 in FIG. 1. The extent of the deformation zone 17 including the adjacent transition portions in the longitudinal direction of the crossmember 2 corresponds to approximately 15% of the longitudinal extent of the crossmember 2 between the two crash box attachment portions 13, 14. The rebounding flanges 15, 16 have a convex rebounding flange protrusion 20 in the region of the deformation zone 17 with its concave structure. This means that the height of the rebounding flange 15 in the region of the rebounding flange protrusion 20 is greater than in the adjacent rebounding flange portions.

In addition to the two deformation zones 17, 18, the bumper crossmember 1 has two further deformation zones 21, 22. The deformation zones 21, 22 are respectively adjacent to a crash box attachment portion 13 and 14. The deformation zone 21 is described below. The same applies equally to the deformation zone 22. The deformation zone 21 is provided by a concave web portion. The concave web portion is a transition portion from the crash box attachment portion 13 to the adjacent portion of the crossmember 2, which has a progressively increasing depth. Therefore, the portion of the web 10 within the crash box attachment portion 13 is in a different spatial position than in the adjacent crossmember portion.

The rebounding flanges 15, 16 end in the crash box attachment portions 13, 14 in their respective first portion. However, their height already decreases in the portion of the crossmember 2 to which the deformation zones 21, 22 also belong. The majority of the crash box portions 13, 14 no longer have a rebounding flange.

Figure 3:
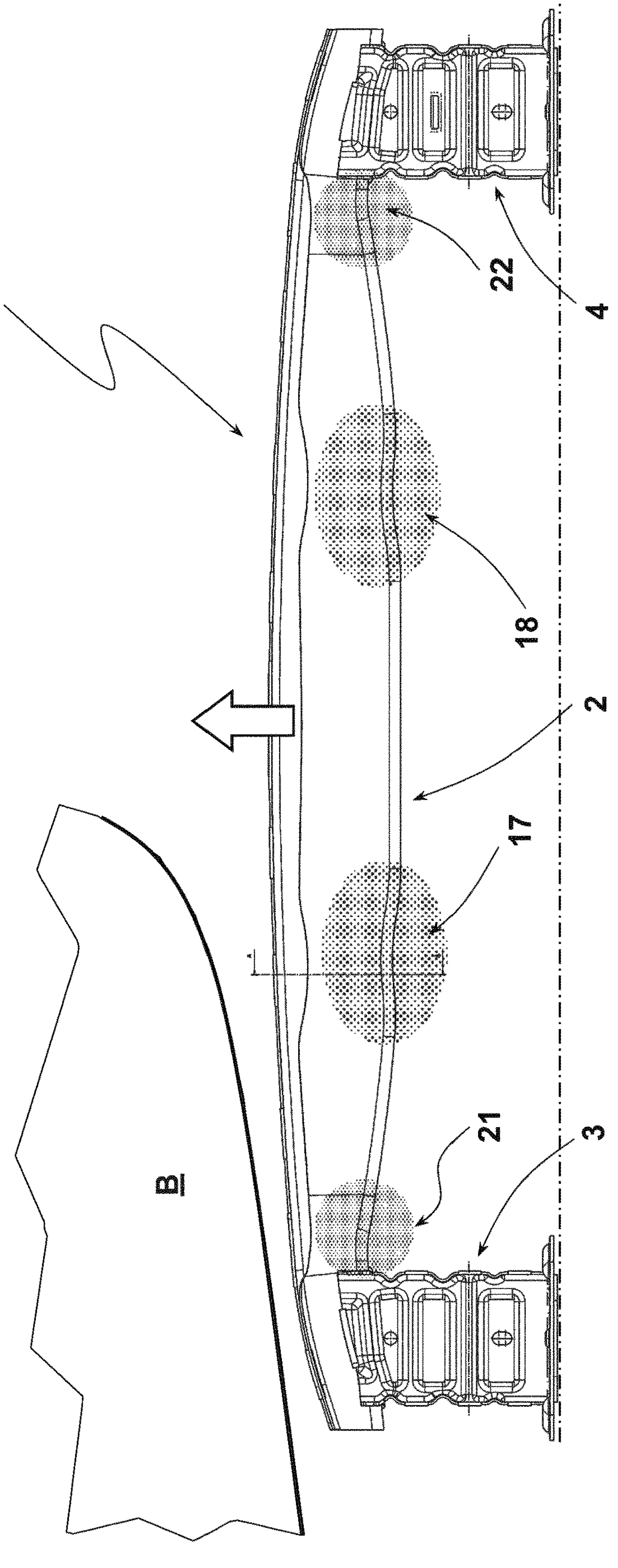
FIG. 3 shows the bumper crossmember of FIG. 1 in an arrangement for carrying out the AZT test.

FIG. 3 shows the bumper crossmember 1 with the deformation zones 17, 18, 21, 22 marked therein with a grid, together with a barrier B according to the AZT test, before the impact of the vehicle (not shown in detail) with its bumper crossmember 1.

Figure 4:
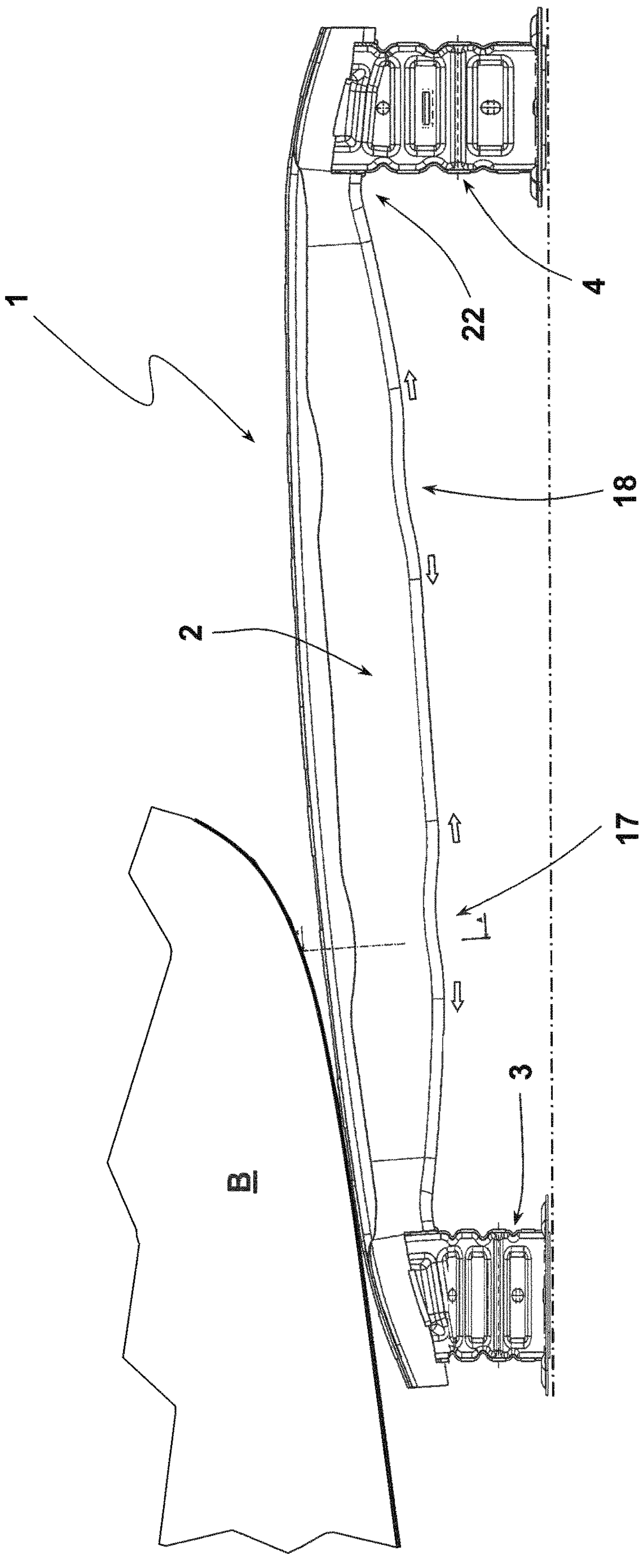
FIG. 4 shows the bumper crossmember of FIG. 3 after completion of the AZT test.

FIG. 4 shows the bumper crossmember and its energy absorption behavior after the impact according to the specifications of the AZT test. Since the barrier B is positioned on the left side of the vehicle, the left crash box 3 of the bumper crossmember 1 has been compressed. In addition to the compression of the crash box 3 for energy absorption, impact energy was also absorbed in the deformation zones 17, 18 and 21, and probably less in the deformation zone 22. In the course of the impact, the crossmember 2 is bent with its striking plate 5 around the deformation zone 22 in the direction of the vehicle due to the compression of the crash box 3. The crash box 4 on the right side of the vehicle, however, is largely unaffected by the impact on the left side. In the course of the buckling of the crossmember 2 due to the compression of the crash box 3, the deformation zone 21 located immediately adjacent to the crash box 3 experiences a certain stretching, while the deformation zones 17, 18 are deformed in the y direction and are also stretched (elongated) due to the unilateral bending of the crossmember 2 during the AZT test. In this respect, the deformation zones 17, 18 with their concave structures represent a material specification that allows a certain amount of stretching in the event of such an impact without tearing. The rebounding flange protrusions 20, which increase the height of the rebounding flanges 15, 16, prevent a frontal buckling, since the crossmember 2 is compressed overall in the x direction by the barrier B and thus this part of the crossmember 2 is also subject to tensile stress.

The deformation zones 17, 18 can also absorb impact energy acting in the y direction. In this case, the concave structures represent predetermined buckling zones in which the concave structures cause a defined folding and thus a defined energy absorption.

Figure 5:
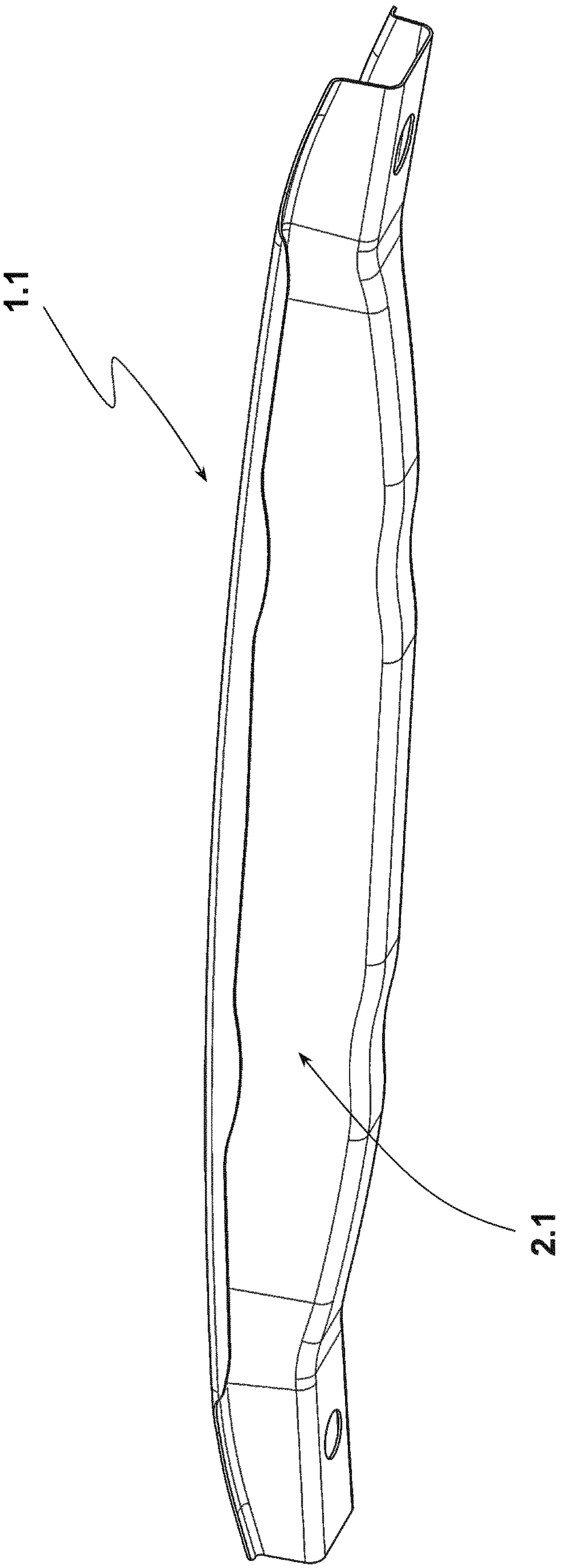
FIG. 5 shows a perspective view of another bumper crossmember according to the disclosure.

FIG. 5 shows a crossmember 2.1 of another bumper crossmember 1.1 (shown without crash boxes connected thereto). In this bumper crossmember 1.1, the forward-facing crossmember opening is not closed with a striking plate. The remaining structure and functionality of this crossmember 2.1 correspond to those of the crossmember 2 of the bumper crossmember 1 described in FIGS. 1 to 4.

The same advantages as described above using the example of the bumper crossmember when subjected to the AZT test also apply to other tests in which the web connecting the limbs of the crossmember is exposed to tensile stress due to deformation, such as for example in the case of the Fuel System Integrity-Rear Impact test. In this test, the barrier acts on the center of the bumper crossmember. Due to the at least one, but preferably multiple, deformation points between the two crash box attachment portions, the crossmember initially bends through due to its convex curvature pointing away from the vehicle; this means that the first deformation work is carried out by the crossmember itself and energy is therefore absorbed before the crash boxes are involved in the deformation process. From this aspect, too, the crash boxes can be designed to be correspondingly shorter than previously known systems.

The invention has been described on the basis of example embodiments. Without departing the scope of the claims, numerous further embodiments and options for implementing the invention result for a person skilled in the art, without these having to shown or explained in greater detail within the context of this disclosure.

LIST OF REFERENCE NUMERALS

1, 1.1 bumper crossmember
2, 2.1 crossmember
3 crash box
4 crash box
striking plate
6 connection plate
7 connection plate
8 limb or arm
9 limb or arm
10 connecting piece or web
11 flange
12 flange
13 crash box attachment portion
14 crash box attachment portion
15 rebounding flange
16 rebounding flange
17 deformation zone
18 deformation zone
19 crossmember cavity
20 rebounding flange protrusion
21 deformation zone
22 deformation zone
B barrier

The invention claimed is:

1. A bumper crossmember for a vehicle, comprising:

a crossmember with a longitudinal extent thereof configured to extend in a vehicle transverse direction and convexly curved in a direction facing away from the vehicle, the crossmember comprising a hat-shaped cross-sectional profile with an upper limb, a lower limb, and a web connecting the two limbs to form a crossmember cavity, wherein a flange is formed on each limb at an end thereof opposite the web, and each flange is angled towards an outside of the crossmember relative to a plane of the respective limb on which the flange is formed, wherein the flanges have, at least in some regions, a rebounding flange formed thereon extending over a portion of the respective limb, and wherein each end of the crossmember has a respective crash box attachment portion, wherein, between the two crash box attachment portions, the crossmember has at least one deformation zone provided by a concave structure formed in the web connecting the limbs in a direction of the crossmember cavity, thus reducing the depth of the crossmember compared to a course of the web without the concave structure, and wherein, in a region of the concave structure along the longitudinal extent of the crossmember, the rebounding flange has a greater flange height than adjacent portions of the rebounding flange due to a convex protrusion of the rebounding flange.

2. The bumper crossmember of claim 1, wherein the concave structure transitions into adjacent portions of the web along the longitudinal extent of the crossmember with a curved transition section.

3. The bumper crossmember of claim 2, wherein the transition section has a radius of curvature which corresponds to a radius of curvature of the concave structure.

4. The bumper crossmember of claim 1, wherein the convex protrusion transitions into adjacent portions of the rebounding flange along the longitudinal extent of the crossmember with a curved transition section.

5. The bumper crossmember of claim 4, wherein the transition section has a radius of curvature that is smaller than a radius of curvature of the convex protrusion.

6. The bumper crossmember of claim 1, wherein the crossmember has a plurality of deformation zones arranged between the two crash box attachment portions.

7. The bumper crossmember of claim 6, wherein the crossmember comprises two deformation zones with an apex region of the concave structure thereof arranged closer, in relation to a longitudinal extent of the crossmember, to a center of the crossmember than to either of the crash box attachment portions.

8. The bumper crossmember of claim 7, wherein each crash box attachment portion is arranged a distance from the center of the crossmember, and the apex region of the concave structure of each of the two deformation zones is separated from a respective closer one of the two crash box attachment portions by 55-60% of the distance between the crash box attachment portion and the center of the crossmember.

9. The bumper crossmember of claim 1, wherein the rebounding flanges of the two limbs terminate in the crash box attachment portions.

10. The bumper crossmember of claim 9, wherein the rebounding flanges extend a maximum of up to 20% into the crash box attachment portions.

11. The bumper crossmember of claim 1, wherein the two limbs of the crossmember have a different length from each other in at least one section located between the crash box attachment portions.

12. The bumper crossmember of claim 11, wherein the upper limb has a greater limb length than the lower limb such that the upper limb protrudes relative to the lower limb of the crossmember.

13. The bumper crossmember of claim 1, wherein a front side of the crossmember cavity is closed in at least one section by a striking plate.

14. The bumper crossmember of claim 1, wherein the crossmember is formed from a high-strength steel.

15. The bumper crossmember of claim 1, wherein two crash boxes are connected to the crossmember to the crash box attachment portions of the crossmember such that upper and lower walls of the crash boxes engage on an outside over the two limbs of the crossmember, and side walls of the crash boxes are supported on a rear side of the web of the crossmember.

16. The bumper crossmember of claim 1, wherein the crossmember has a greater depth adjacent the crash box attachment portions towards a center of the crossmember than in the crash box attachment portions, and wherein the crash box attachment portions transition into those having a greater depth with interposition of a deformation zone provided by a concave portion of the web.

17. A bumper crossmember for a vehicle, comprising:

a crossmember with a longitudinal extent thereof configured to extend in a vehicle transverse direction and convexly curved in a direction facing away from the vehicle, the crossmember comprising a hat-shaped cross-sectional profile with an upper limb, a lower limb, and a web connecting the two limbs to form a crossmember cavity, wherein a flange is formed on each limb at an end thereof opposite the web, and each flange is angled towards an outside of the crossmember relative to a plane of the respective limb on which the flange is formed, wherein the flanges have, at least in some regions, a rebounding flange formed thereon extending over a portion of the respective limb, and wherein each end of the crossmember has a respective crash box attachment portion, wherein the crossmember has a greater depth adjacent the crash box attachment portions towards a center of the crossmember than in the crash box attachment portions, and wherein the crash box attachment portions transition into those having a greater depth with interposition of a deformation zone provided by a concave portion of the web in a direction of the crossmember cavity, thus reducing the depth of the crossmember compared to a course of the web without the concave structure, and wherein, in a region of the concave structure along the longitudinal extent of the crossmember, the rebounding flange has a greater flange height than adjacent portions of the rebounding flange due to a convex protrusion of the rebounding flange.

18. The bumper crossmember of claim 17, wherein, between the two crash box attachment portions, the crossmember comprises at least one additional deformation zone provided by a concave structure formed in the web connecting the limbs in a direction of the crossmember cavity, wherein, in a region of the concave structure along the longitudinal extent of the crossmember, the rebounding flange has a greater flange height than adjacent portions of the rebounding flange due to a convex protrusion of the rebounding flange, wherein the concave structure transitions into adjacent portions of the web along the longitudinal extent of the crossmember with a curved transition section having a radius of curvature which corresponds to a radius of curvature of the concave structure, and wherein the convex protrusion transitions into adjacent portions of the rebounding flange along the longitudinal extent of the crossmember with a curved transition section having a radius of curvature that is smaller than a radius of curvature of the convex protrusion.

19. The bumper crossmember of claim 17, wherein the rebounding flanges of the two limbs terminate in the crash box attachment portions and extend a maximum of up to 20% into the crash box attachment portions.

20. The bumper crossmember of claim 17, wherein the upper limb has a greater limb length than the lower limb in at least one section located between the crash box attachment portions such that the upper limb protrudes relative to the lower limb of the crossmember.

* * * * *